US010165619B2

(12) United States Patent
Allada et al.

(10) Patent No.: US 10,165,619 B2
(45) Date of Patent: Dec. 25, 2018

(54) GENERATION OF A FINGERPRINT OF AN ACCESS POINT

(71) Applicant: Intel Corporation, Santa Clara, CA (US)

(72) Inventors: Anisha Allada, Hillsboro, OR (US); Abhijeet Kolekar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 15/283,041

(22) Filed: Sep. 30, 2016

(65) Prior Publication Data

US 2018/0098377 A1 Apr. 5, 2018

(51) Int. Cl.
| | |
|---|---|
| *H04W 76/34* | (2018.01) |
| *H04B 17/318* | (2015.01) |
| *G09G 5/00* | (2006.01) |
| *H04W 64/00* | (2009.01) |
| *H04W 84/12* | (2009.01) |

(52) U.S. Cl.
CPC ............ *H04W 76/34* (2018.02); *G09G 5/003* (2013.01); *H04B 17/318* (2015.01); *H04W 64/003* (2013.01); *G09G 2370/025* (2013.01); *G09G 2370/16* (2013.01); *H04W 84/12* (2013.01)

(58) Field of Classification Search
CPC ... H04W 76/34; H04W 64/003; H04W 84/12; H04B 17/318; G09G 5/003; G09G 2370/16; G09G 2370/025
See application file for complete search history.

(56) References Cited

U.S. PATENT DOCUMENTS

| 2007/0021126 A1 | 1/2007 | Nanda et al. |
| 2012/0149380 A1 | 6/2012 | Olson |
| 2014/0304770 A1 | 10/2014 | Jung |
| 2017/0371024 A1* | 12/2017 | Ivanov .................. G01S 5/0252 |

FOREIGN PATENT DOCUMENTS

| KR | 10-2007-0037096 A | 4/2007 |
| WO | 2013180362 A1 | 12/2013 |

OTHER PUBLICATIONS

International Search Report and Written Opinion dated Dec. 7, 2017, on application No. PCT/US2017/049192.

* cited by examiner

*Primary Examiner* — Omar J Ghowrwal
(74) *Attorney, Agent, or Firm* — Lowenstein Sandler LLP

(57) ABSTRACT

A wireless device may disconnect a wireless connection to a remote device. The wireless device may include a memory device and one or more processors coupled to the memory device. The processors may generate a first wireless fingerprint of the wireless device, wherein the first wireless fingerprint comprises a first basic service set identification (BSSID) of a first access point to which the wireless device is connected. The processors may further determine if the BSSID of the wireless device is changed and if the BSSID is changed perform an active scan of a plurality of wireless channels. The processors may further generate a second wireless fingerprint for the wireless device based on the active scan and disconnect a wireless connection of the wireless device if the first wireless fingerprint is at least partially different from the second wireless fingerprint.

20 Claims, 6 Drawing Sheets

GENERATION OF A FINGERPRINT OF AN ACCESS POINT

BACKGROUND

The disclosure relates to the field of wireless communications, including wireless transmission of display data.

BRIEF DESCRIPTION OF THE DRAWINGS

Various exemplary implementations of the present disclosure will be understood more fully from the detailed description given below and from the accompanying drawings of various exemplary implementations of the disclosure.

DETAILED DESCRIPTION

Figure 1:
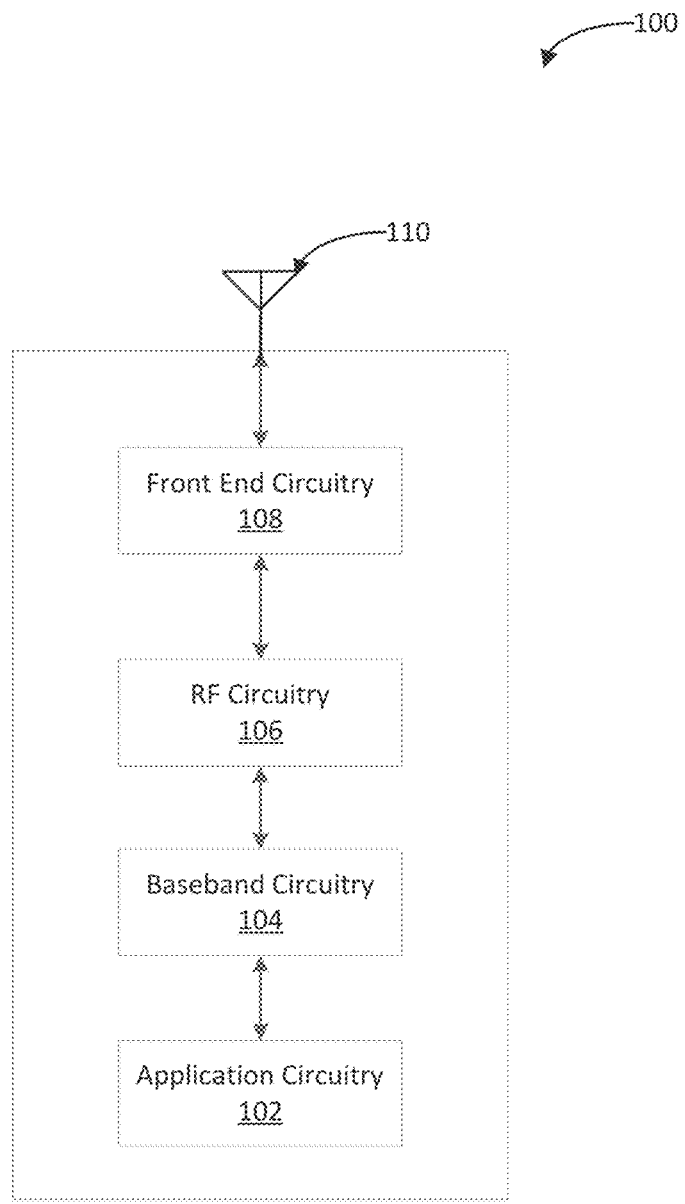
FIG. 1 is a block diagram illustrating components of an electronic device exemplary implementing aspects of the disclosure, according to an implementation.

Some wireless devices may share screen content with remote display devices. For example, a laptop computer may wirelessly transmit its screen to a remote display device, such as a computer monitor, TV, another laptop, projector, or the like. The wireless device may transmit the display content directly to the remote display device over a wireless transmission. However, a wireless device may not be able to transmit the content directly to the remote display device if the wireless device and display device do not use the same wireless channels or other wireless parameters. Accordingly, a wireless device may share display content with a remote display device over a network. For instance, the remote display device and wireless device may each be connected to the same local network. The wireless device may then transmit data representing the screen content to an access point of the network. The network may then forward the data to the remote display device. For example, a wireless device may transmit data to an access point and that may forward display data to the remote display device.

In a direct connection the wireless device may automatically disconnect from the remote display device when the wireless device is removed from the vicinity of the remote display device. For example, if a wireless device has a direct connection to a projector in a conference room, the connection may be terminated when the wireless device is removed from the conference room. This may be done automatically because the signals from the wireless device and remote display device are not strong enough to maintain the connection or in response to a change in signal strength. A wireless device with a direct connection to a remote display device may also be disconnected manually by the wireless device or the remote display device.

In a connection between a wireless device and a remote display device over a network, the wireless device may be disconnected from the remote display device manually. However, the wireless device may not disconnect automatically when it is removed from the vicinity of the remote display device because the network connection may be maintained. For example, if a wireless device is connected over an office network to a remote display device in a conference room, the wireless device may still be connected to the office network after removal from the conference room. Accordingly, the wireless device and remote display device may continue a connection over the network after the wireless device is removed from the conference room. Thus, the wireless device may continue to share a screen with the remote display device when a user of the wireless device is unaware of the sharing. This may lead to privacy and other issues for the user of a wireless device.

In order to automatically terminate a network connection from a remote display device when leaving the vicinity of the remote display device, a wireless device may determine that it has left the vicinity based on changes to a wireless fingerprint. A wireless fingerprint may include data relating to access points, networks, and the like that are identified by the wireless device. For example, a wireless fingerprint may be a list of wireless networks that are in the vicinity of the wireless device. The wireless fingerprint may store the available wireless networks with an associated identification and an indication of the strength of the signals received over each network. Accordingly, as the wireless device moves, the strength of available networks may change indicating a change in position of the wireless device. In some exemplary implementations, the wireless fingerprint may include a list of service set identifiers (SSIDs) that are detected by the wireless device. The SSIDs may each be associated with a basic service set identifier (BSSID) and a received signal strength indication (RSSI). The SSIDs used to generate a wireless fingerprint may be limited to those networks with the highest signal strengths. As a wireless device changes locations, the wireless fingerprint may change as the wireless device gets closer to some access points and further from other access points or one or more obstacles reduces signal strength from one or more access points. If the wireless fingerprint changes by more than certain thresholds, the wireless device may determine that it is to disconnect from the network connection to the remote display device. For example, a threshold may be set as a number of networks that are in an original and in a current wireless fingerprint. In some exemplary implementations, a threshold may be set as a number of networks that are in an original and in a current wireless fingerprint that have a RSSI within a threshold range of the RSSI values in the original wireless fingerprint.

In order to initiate a connection from the wireless device to a remote display device, the wireless device may perform a discover operation to identify remote display devices available to the wireless device. For example, available remote display devices may be identified based on a list of network resources, signals transmit by the remote display device to identify the device, or the like. After the discovery operation, the wireless device may select a remote display device for sharing screen content. The wireless device and selected remote display device may setup capabilities and settings for streaming screen content using a Real Time Streaming Protocol (RTSP) or a similar protocol. Capabilities and settings may include, for example, video frame rate, frame size, encryption, audio format, compression, or the like. After capabilities and settings are negotiated, the wireless device may begin sharing screen content to the remote display device. In some exemplary implementations, the screen content may be a duplication of the wireless devices screen or the remote display device may be used as a second screen by the wireless device.

At the time the wireless device begins sharing screen content the wireless device may generate an initial wireless fingerprint based on a set of currently detected networks. The wireless fingerprint may include SSIDs with associated BSSIDs and RSSIs. The wireless device may generate the wireless fingerprint by performing an active scan for wireless channels. The active scan may detect signals on each channel the wireless device is capable of using. The signals for a particular channel may be used to identify an SSID, BSSID, and RSSI for that channel. The initial wireless fingerprint may be used for comparison to later wireless fingerprints taken to determine if the wireless device has moved from the vicinity of the remote display device.

While sharing the screen content, the wireless device may continuously determine whether to automatically disconnect from the remote display device. For example, the wireless device may generate new wireless fingerprints to determine whether to disconnect from the remote display device. The wireless device may determine to disconnect from the remote display device if the fingerprints do not match within a set of threshold values. The threshold values may be set based on the signal strength of networks detected by the wireless device.

Continuously generating a new wireless fingerprint to compare to the initial wireless fingerprint may cause performance issues for sharing the screen content. For example, performing an active scan to continuously generate new fingerprints may reduce the resources available to the wireless device for streaming screen content to the remote display device over the network. Accordingly, in some exemplary implementations, the wireless device may not continuously perform an active scan of all available channels. Rather, the wireless device may only perform an active scan in response to certain triggers. For example, the scan may be performed periodically, such as at a set time interval. In some exemplary implementations, the wireless device may only perform an active scan to generate a new fingerprint in response to determining that the wireless device is connected to a different access point compared to the original fingerprint. For example, the wireless device may periodically determine whether the BSSID of an access point to which it is attached has changed. If the access point has changed, the wireless device may perform an active scan of wireless channels to generate a new wireless fingerprint.

Based on the new wireless fingerprint, the wireless device may determine if the new wireless fingerprint matches the initial wireless fingerprint closely enough to continue the connection to the remote display device. In some exemplary implementations, the current fingerprint may be considered within a threshold of the original fingerprint if the remote display device used to establish the connection is in the current fingerprint. The current fingerprint may also be considered within a threshold of the original fingerprint if the current and initial RSSI values between the wireless device and the remote display are within the threshold. The current fingerprint may also be considered within a threshold of the original fingerprint if there are a threshold number of BSSIDs or SSIDs common to the original and current fingerprint. In some exemplary implementations, the current fingerprint may also be considered within a threshold of the original fingerprint if there are a threshold number of BSSIDs common to the original and current fingerprint that have RSSI values within a threshold. Then, a current and initial fingerprint may be considered matched, at least partially, if at least a threshold number of SSIDs are matched. For example, a current fingerprint may be considered matched if at least 50% of the RSSIs in the fingerprint match.

If the current fingerprint is determined to match, at least partially, an initial fingerprint, the connection between the wireless device and the remote display device may be maintained. If the current fingerprint is determined not to match the initial fingerprint, the connection between the wireless device and the remote display device may be terminated by the wireless device.

Although the connection is generally described with reference to screen content data, other data may be shared over a wireless connection from a wireless device to a remote display device. For example, audio data, performance data, user information, or the like may be provided to the remote display device. Additionally, the remote display device may be another type of device. For example, the remote display device may be a server system that captures screen data or another type of data from one or more wireless devices connected to a network. In some exemplary implementations, additional applications of the fingerprint matching processes described may be used.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed disclosure. However, various aspects of the disclosed exemplary implementations may be practiced in other examples that depart from these specific details. In certain instances, descriptions of well-known devices, circuits, and methods are omitted so as not to obscure the description of the present disclosure with unnecessary detail.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some exemplary implementations, the circuitry may be implemented in, or functions associated with the circuitry may be implemented by, one or more software or firmware modules. In some exemplary implementations, circuitry may include logic, at least partially operable in hardware.

Exemplary implementations described herein may be implemented into a system using any suitably configured hardware and/or software. FIG. 1 illustrates, for one exemplary implementation, a block diagram of example components of a wireless device 100. In some exemplary implementations, the wireless device 100 may include application circuitry 102, baseband circuitry 104, radio frequency (RF) circuitry 106, front-end circuitry 108, and one or more antennas 110, coupled together at least as shown.

In the wireless device 100, the application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. In some exemplary implementations, the application circuitry 102 may execute one or more applications that generate display data. The display data may be shared with a remote display device through the baseband circuitry 104, the RF circuitry 106, the front-end circuitry 108, and antenna 110. In some exemplary implementations, the application circuitry may further instruct the baseband circuitry to establish a connection to a remote display device. The application circuitry may also terminate a connection to a remote display device in response to received input, determination that the remote display device is out of range, or other criteria.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some exemplary implementations, the baseband circuitry 104 may include a second generation (2G) baseband processor, a third generation (3G) baseband processor, a fourth generation (4G) baseband processor, and/or other baseband processor(s) for other existing generations, generations in development, or to be developed in the future (e.g., fifth generation (5G), 6G, or the like). The baseband circuitry 104 may handle various radio control functions that enable communication with one or more radio networks via the RF circuitry 106. The radio control functions may include, but are not limited to, signal modulation/demodulation, encoding/decoding, radio frequency shifting, etc. In some exemplary implementations, the baseband circuitry 104 may determine whether to maintain a connection between the wireless device 100 and a remote display device. For example, the baseband circuitry 104 may determine that the wireless device 100 has been removed from an area having the remote display device based on the wireless networks and access points detected by the wireless device.

In some exemplary implementations, modulation/demodulation circuitry of the baseband circuitry 104 may include Fast-Fourier Transform (FFT), preceding, and/or constellation mapping/demapping functionality. In some exemplary implementations, encoding/decoding circuitry of the baseband circuitry 104 may include convolution, tailbiting convolution, turbo, Viterbi, and/or Low Density Parity Check (LDPC) encoder/decoder functionality. Exemplary implementations of modulation/demodulation and encoder/decoder functionality are not limited to these examples and may include other suitable functionality in other exemplary implementations.

In some exemplary implementations, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) of the baseband circuitry 104 may be configured to run elements of the protocol stack for signaling of the PHY, MAC, RLC, PDCP, NAS and/or RRC layers. In some exemplary implementations, the baseband circuitry may include one or more audio digital signal processor(s) (DSP). The audio DSP(s) may include elements for compression/decompression and echo cancellation and may include other suitable processing elements in other exemplary implementations. Components of the baseband circuitry may be suitably combined in a single chip, a single chipset, or disposed on a same circuit board in some exemplary implementations. In some exemplary implementations, some or all of the constituent components of the baseband circuitry 104 and the application circuitry 102 may be implemented together such as, for example, on a system on a chip (SoC).

In some exemplary implementations, the baseband circuitry 104 may provide for communication compatible with one or more radio technologies. For example, in some exemplary implementations, the baseband circuitry 104 may support communication with an evolved universal terrestrial radio access network (EUTRAN) and/or other wireless metropolitan area networks (WMAN), a wireless local area network (WLAN), a wireless personal area network (WPAN). Exemplary implementations in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various exemplary implementations, the RF circuitry 106 may include switches, filters, amplifiers, etc. to facilitate the communication with the wireless network. RF circuitry 106 may include a receive signal path which may include circuitry to down-convert RF signals received from the front end circuitry 108 and provide baseband signals to the baseband circuitry 104. RF circuitry 106 may also include a transmit signal path which may include circuitry to up-convert baseband signals provided by the baseband circuitry 104 and provide RF output signals to the front end circuitry 108 for transmission.

Front end circuitry 108 may include a receive signal path which may include circuitry configured to operate on RF signals received from one or more antennas 110, amplify the received signals and provide the amplified versions of the received signals to the RF circuitry 106 for further processing. Front end circuitry 108 may also include a transmit signal path which may include circuitry configured to amplify signals for transmission provided by the RF circuitry 106 for transmission by one or more of the one or more antennas 110.

In some exemplary implementations, the front end circuitry 108 may include a TX/RX switch to switch between transmit mode and receive mode operation. The front end circuitry 108 may include a receive signal path and a transmit signal path. The receive signal path of the front end circuitry 108 may include a low-noise amplifier (LNA) to amplify received RF signals and provide the amplified received RF signals as an output (e.g., to the RF circuitry 106). The transmit signal path of the front end circuitry 108 may include a power amplifier (PA) to amplify input RF signals (e.g., provided by RF circuitry 106), and one or more filters to generate RF signals for subsequent transmission (e.g., by one or more of the one or more antennas 110).

In some exemplary implementations, the wireless device 100 may include additional elements such as, for example, memory/storage, display, camera, sensor, and/or input/output (I/O) interface.

Figure 2:
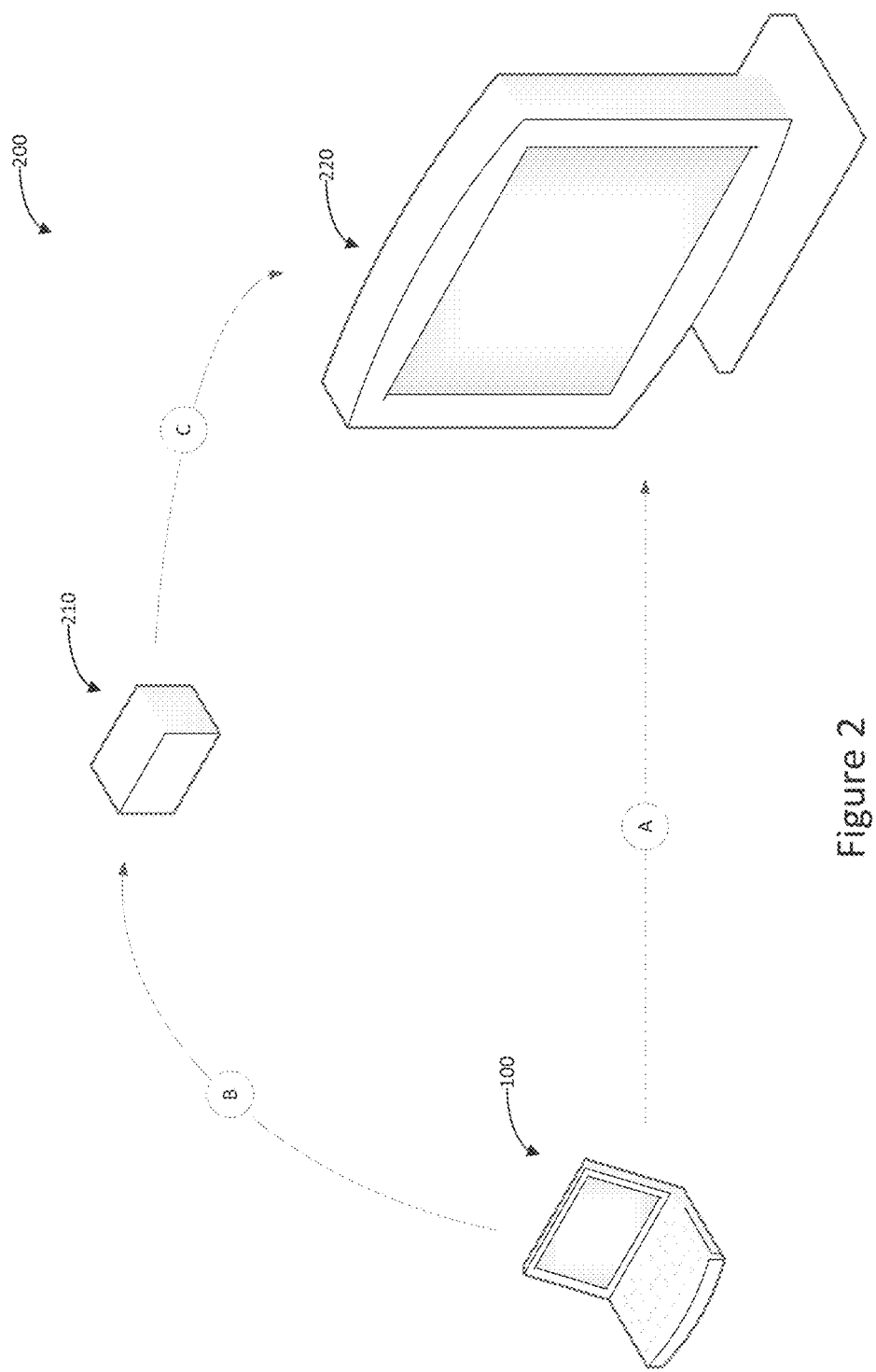
FIG. 2 is a block diagram illustrating components of a network environment, according to an exemplary implementation.

FIG. 2 is a block diagram depicting components of a network environment 200 enabling sharing of screen content from a wireless device to a remote display device. The block diagram shows a wireless device 100, an access point 210, and a remote display device 220. The wireless display device 100 may be as described above with reference to FIG. 1.

The remote display device 220 may include components similar to wireless device 100, such as application circuitry, baseband circuitry, RF circuitry, front-end circuitry, and one or more antenna. In some exemplary implementations, the remote display device 220 may have a housing that includes these components. In some exemplary implementations, a dongle may be coupled to the remote display device 220 to provide these or similar components. For example, the display device 220 may have a dongle attached through a universal serial bus, a high-definition multimedia interface, or another connection. The dongle may include one or more of an antenna, front-end module, baseband circuitry, application circuitry, or the like. In some exemplary implementations, the remote display device 220 may include circuitry both in a housing and an attached dongle for performing processes as described herein.

The access point 210 may be a network device that communicates with one or more wireless devices. The access point 210 may connect the wireless devices to a local network. The connection to the local network may enable communication between wireless devices connected to the network or further connections to other networks. For example, the access point 210 may forward communications received from the wireless device 100 to the remote display device 220. Accordingly, the access point 210 may forward transmissions received over connection "B" to the remote display device 220 over connection "C." The connections may provide similar performance as a direct wireless connection "A" between the wireless device 100 and the remote display device 220. In some exemplary implementations, the access point 210 may connect to a router or may be integral to a router that is connected to a corporate network to enable communications between devices connected to the network.

The wireless device 100 may further determine whether to terminate a connection from the remote display device 220 based on a wireless fingerprint. For example, wireless device 100 may generate a wireless fingerprint including a number of RSSI values for access points in the vicinity of the wireless device 100. Based on a change in a subsequent wireless fingerprint, the wireless device 100 may determine to terminate the connections "B" and "C" that were used to provide display data to the remote display device 220. For example, the subsequent wireless fingerprint generated by the wireless device 100 may be very different than an initial wireless fingerprint if the wireless device 100 has moved far from an initial point. Accordingly, the wireless device 100 may use the difference in the wireless fingerprints to determine that the wireless device 100 is no longer in the same vicinity of the remote display device 220. In response, the wireless device 100 may terminate the wireless connection to the remote display device 220.

In the network environment 200 shown in FIG. 2, the access point 210 may provide a path to transfer data from the wireless device 100 to the remote display device 220. For example, a direct wireless connection "A" between the wireless device 100 and the remote display device 220 may be unavailable. However, the wireless device 100 may provide display data to the remote display device 220 through a first wireless connection "B" between the wireless device 100 and the access point 210 and a second wireless connection "C" between the access point 210 and the remote display device 220. For example, the wireless device 100 may transmit display data to the access point 210 over wireless connection "B." The access point 210 may then forward the display data to the remote display device 220 over wireless connection "C." The access point 210, or a router attached to the access point 210, may forward the data based on an address of the remote display device 220 provided with the data from the wireless device 100. Because the wireless device 100 may leave the vicinity of the remote display device 220, but continue a connection to the same network, the wireless device 100 may continue to send display data to the remote display device 220 through the same or a different access point 210.

Figure 3:
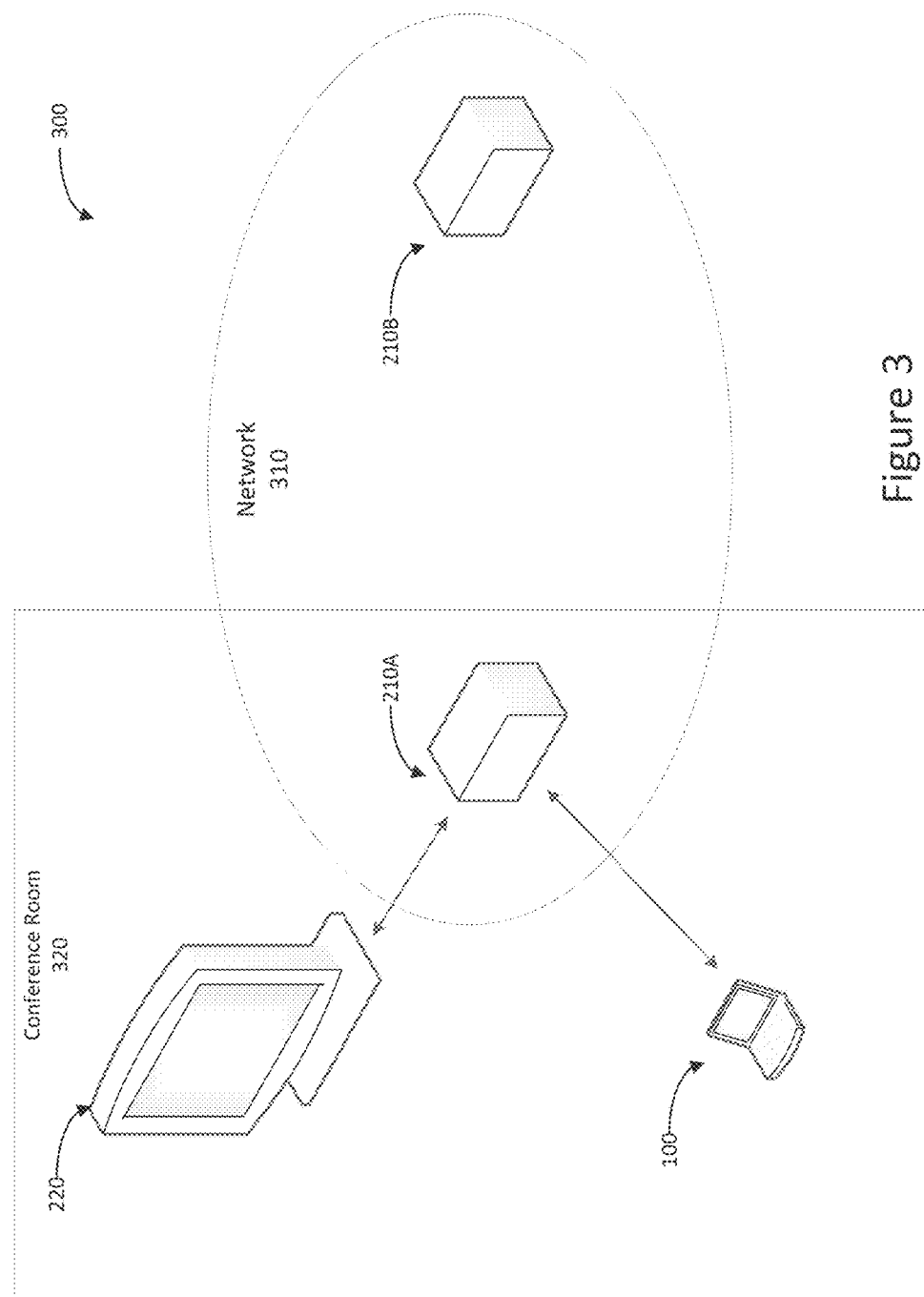
FIG. 3 is a block diagram illustrating components of a network environment, according to an exemplary implementation.

FIG. 3 is a block diagram showing a network environment 300 with a wireless device 100 and a remote display device 220. In some exemplary implementations, the wireless device 100 may be another type of wireless source to provide and the remote display device may be another type of wireless sink to receive data. In some exemplary implementations, the remote display device 220 may be another wireless device 100 and may act as a wireless source as well as a wireless sink.

In FIG. 3, a wireless device 100 and a remote display device 220 may be in the same conference room 220. The wireless device 100 may establish a connection with the remote display device 220 through an access point 210A. The connection may be established manually or automatically by the wireless device 100 when the wireless device 100 enters conference room 320. For example, the wireless device 100 may receive a search for remote display devices that are in range of the wireless device 100 based on signals received at the wireless device 100 or data stored regarding remote display devices associated with conference room 320.

The wireless device 100 may negotiate with the remote display device 220 to establish a connection for sharing display data. The negotiation may set capabilities and parameters for the connection including video frame rate, frame size, encryption, audio format, compression, or the like. After capabilities and settings are negotiated, the wireless device 100 may begin sharing screen content to the remote display device 220 over access point 210A. The access point 210A may be connected to a network 310 that also includes access point 210B. In some exemplary implementations, the network 310 may include additional access points. The access point 210A may forward display data from wireless device 100 to remote display device 220. For instance, the display data may include an address associated with remote display device 220.

Figure 4:
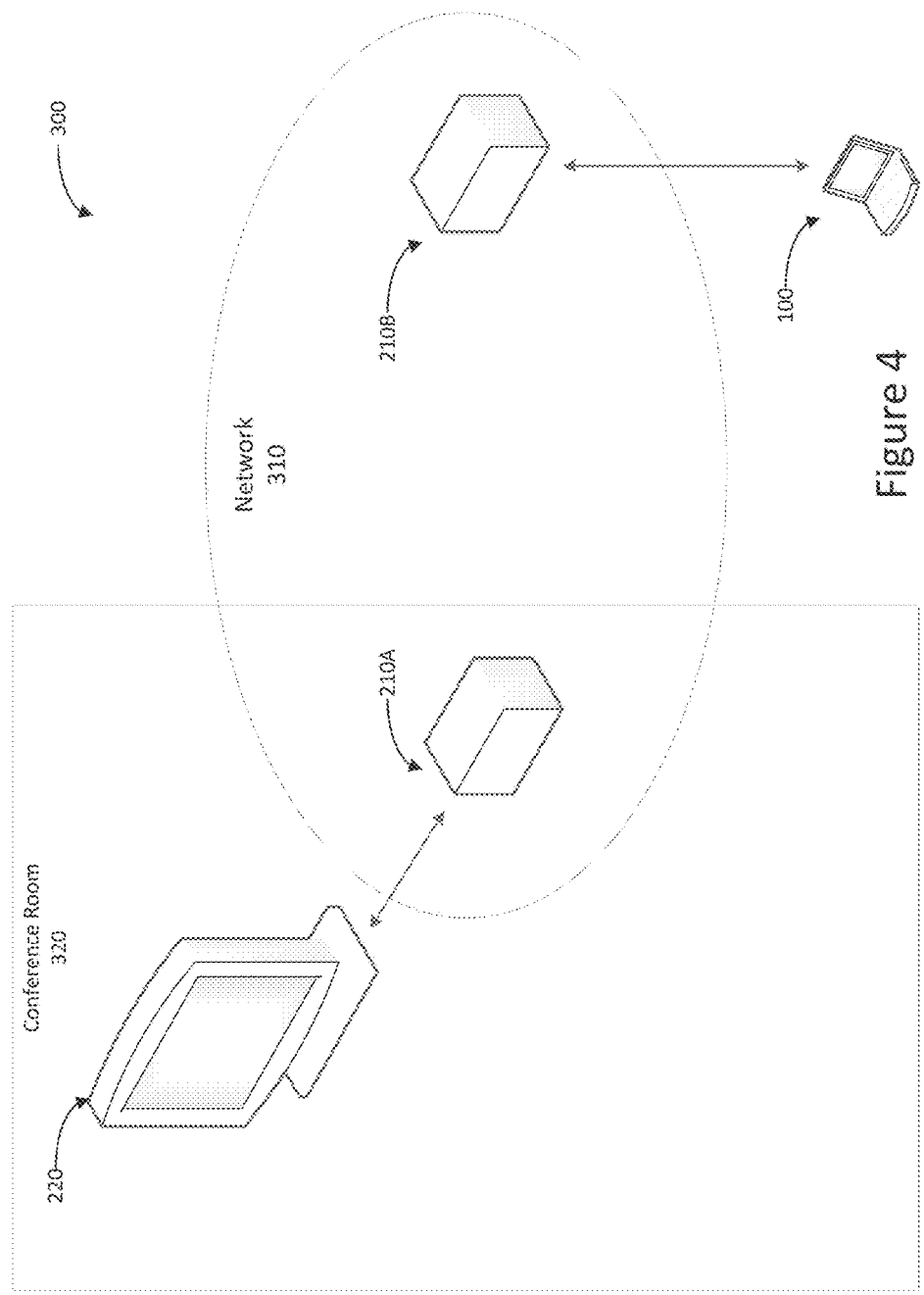
FIG. 4 is a block diagram illustrating components of a network environment, according to an exemplary implementation.

FIG. 4 is a block diagram showing a network environment 300 similar to that shown in FIG. 3, except that the wireless device 210B is moved from conference room 320. If the wireless device 100 leaves the conference room 320, the wireless device 100 may not automatically terminate the connection to the remote display device 220. For example, the wireless device 100 may continue to transmit display data to another access point (for example, access point 210B) connected to network 310. The wireless access point 210B may then determine based on an address in the display data that the data should be forwarded over network 310 to the remote display device 220.

In order to prevent transmitting display data to remote display device 220 after leaving conference room 320, the wireless device 100 may identify changes to a wireless fingerprint. For example, the wireless device 100 may determine that a signal strength received from access point 210A is weaker after the wireless device 100 left conference room 320. In some exemplary implementations, the wireless device 100 may record a fingerprint comprising a variety of networks, access points, and associate signal strengths. The wireless device 100 may then compare those fingerprints as discussed below with reference to FIG. 5. If the fingerprints match or partially match, the wireless device 100 may determine to keep the connection to the remote display device 220. If the wireless device 100 determines that the fingerprints do not partially match within one or more thresholds, the wireless device 100 may terminate the connection to the remote display device 220 and stop transmitting display data. Therefore, the display connection may be automatically terminated when the wireless device 100 leaves a conference room 320. This may increase the privacy and security of the wireless device 100 because display data will not be shared after the wireless device 100 leaves a conference room 320 where sharing data was intentional.

Figure 5:
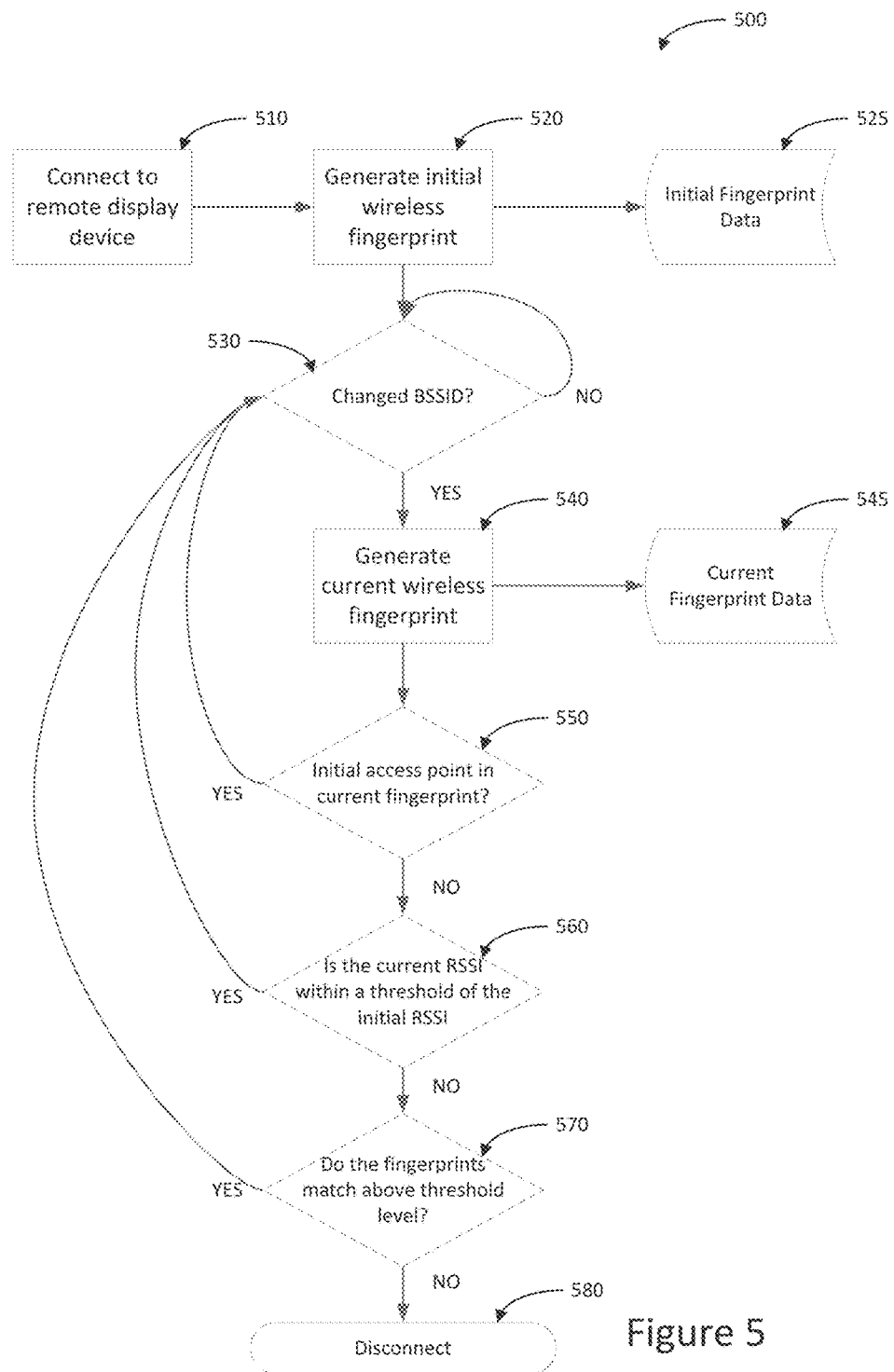
FIG. 5 illustrates a flowchart of an example method of determining whether to terminate a wireless connection, according to an exemplary implementation.

FIG. 5 is a flow chart depicting an example process for determining whether a wireless device is to disconnect from a remote display device. The method 500 may be performed by processing logic that may comprise hardware (circuitry, dedicated logic, etc.), software (e.g., software executed by a general purpose computer system or a dedicated machine), or a combination of both. In alternative exemplary implementations, some or all of the method 500 may be performed by other components of a wireless device. It should be noted that blocks depicted in FIG. 5 can be performed simultaneously or in a different order than that depicted. In addition, methods in accordance with the disclosure may include fewer or additional operations than those described with reference to FIG. 5.

Beginning in block 510, a wireless device may connect to a remote display device. For example, a wireless device may negotiate parameters and settings with a remote display device for communications. The connection may be through an access point in a wireless network. The access point may forward display data received from the wireless device to the remote display device.

Figure 6A:
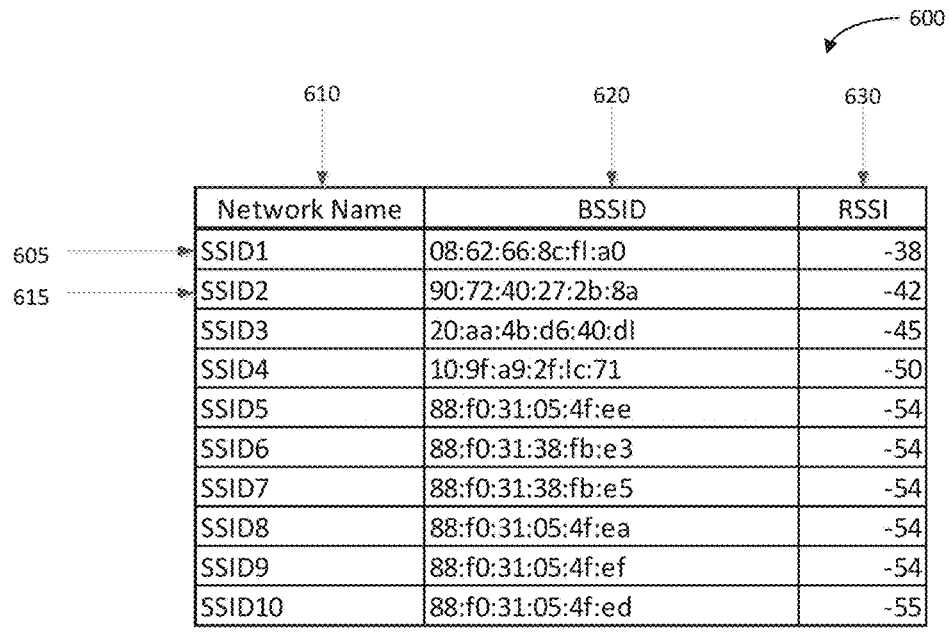
FIG. 6A illustrates example wireless fingerprints generated by an electronic device, according to an exemplary implementation.
Figure 6B:
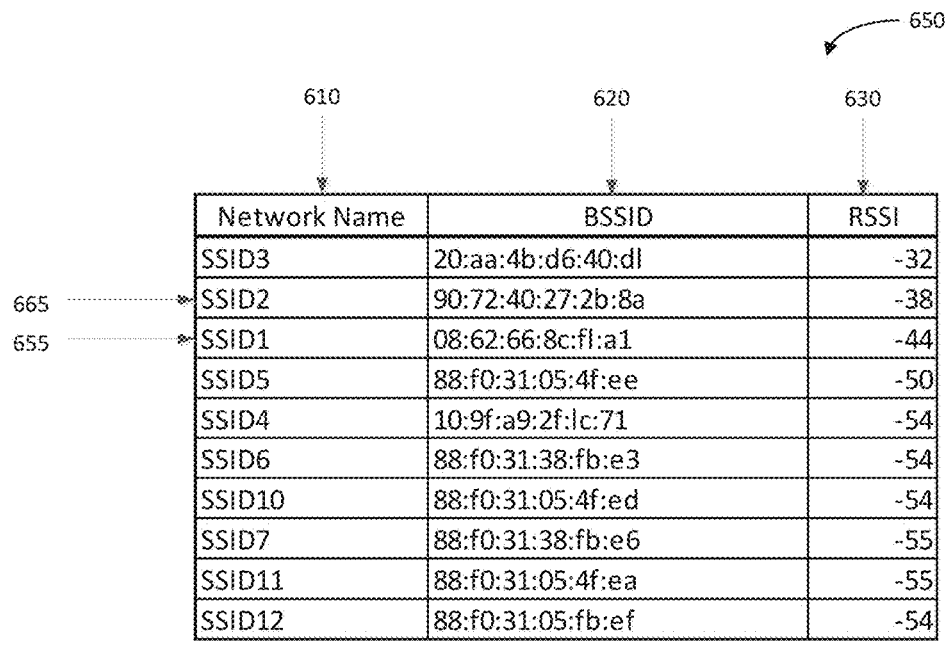
FIG. 6B illustrates example wireless fingerprints generated by an electronic device, according to an exemplary implementation.

In block 520, the wireless device generates an initial wireless fingerprint. A wireless fingerprint may include data relating to access points, networks, and the like that are identified by the wireless device. In some exemplary implementations, the wireless fingerprint may include a list of service set identifiers (SSIDs) that are detected by the wireless device. The SSIDs may each be associated with a basic service set identifier (BSSID) and a received signal strength indication (RSSI). In some exemplary implementations, the fingerprint may include a set number of SSIDs associated with the strongest signal received at the wireless device. The wireless device may generate the wireless fingerprint by performing an active scan for wireless channels. The active scan may detect signals on each channel the wireless device is capable of using. The signals for a particular channel may be used to identify an SSID, BSSID, and RSSI for that channel. The initial wireless fingerprint may be used for comparison to later wireless fingerprints taken to determine if the wireless device has moved from the vicinity of the remote display device. The wireless fingerprint may be stored at the wireless device as initial fingerprint data 525. The initial fingerprint data 525 may remain static while the current connection to a remote display device is connected. Example fingerprints are shown in FIGS. 6A and 6B.

In blocks 530-580, the wireless device determines whether to terminate the current session between the wireless device and the remote display device. Beginning in block 530, the wireless device determines whether the BSSID of the access point to which the wireless device is connected has changed. The wireless device may compare the BSSID of the access point currently used by the wireless device to a BSSID stored in the initial fingerprint data. For example, if the wireless device has moved to a new location in a corporate environment, it may connect to a different access point to access a local network. Accordingly, the BSSID to which the wireless device is connected may change. If the BSSID has not changed, the wireless device may determine that the connection to the remote display device should be maintained.

In some exemplary implementations, the wireless device may check if the BSSID has changed periodically. For example, the wireless device may only check that the BSSID has changed once every 5 seconds. This may reduce the processing performed by the wireless device and interference with data being transmit by the wireless device. For example, the additional processes performed to determine whether to disconnect from the remote display device may interfere with transmitting display data to the access point by the wireless device. Accordingly, to reduce interference, the current BSSID may only be compared to an initial BSSID periodically. If the wireless device determines that the BSSID has changed, it may continue to block 540.

In block 540, the wireless device generates a current wireless fingerprint. The current wireless fingerprint may be generated similar to the initial wireless fingerprint using an active scan of available networks. The current wireless fingerprint may include a list of service set identifiers (SSIDs) that are detected by the wireless device. The SSIDs may each be associated with a basic service set identifier (BSSID) and a received signal strength indication (RSSI). In some exemplary implementations, the fingerprint may include a set number of SSIDs associated with the strongest signal received at the wireless device. The wireless device may store the wireless fingerprint as current fingerprint data 545.

In block 550, the wireless device determines if the remote display device is in the current fingerprint. For example, the wireless device may compare the BSSIDs of the access points in the current fingerprint data 545 to determine if the BSSID of remote display device is available. If remote display device is in the current fingerprint data 545, the wireless device may determine not to disconnect from the remote display device. If the wireless device determines not to disconnect from the remote display device, it may return to periodically checking if the BSSID has changed. In some exemplary implementations, the current fingerprint data 545 may be discarded if the connection is maintained. In some exemplary implementations, the current fingerprint data 545 may be used as new initial fingerprint data if the connection between the wireless device and the remote display device is maintained.

If the wireless device determines that the remote display device is not in the current fingerprint, it may continue to block 560. In block 560, the wireless device may compare the current RSSI of the initial access point to the initial RSSI value of the initial access point. For example, in addition to the RSSI values of a set number of access points in the network fingerprint, the wireless device may have an RSSI value for the initial access point. If the current RSSI value for the initial access point is within a threshold range of the initial RSSI value for the access point, the wireless device may determine not to disconnect from the remote display device and may return to periodically checking if the BSSID has changed. If the current RSSI value and initial RSSI value for the initial access point are not within a threshold, the wireless device may continue to block 570. In some exemplary implementations, the threshold for comparing the RSSI values may be a set number comparing values. For example, the threshold may be 5 units for a particular exemplary implementation. In some exemplary implementations, other ranges of values for an RSSI threshold may be used. In some exemplary implementations, instead of RSSI values, the current and initial fingerprints, the wireless device may use other measurements of signal strength to determine whether to disconnect from a remote display device. For example, instead of relative measurements of signal quality, the wireless device may use a direct measurement of the power of signals received from various access points.

In block 570, the wireless device determines whether to initial fingerprint data 525 and the current fingerprint data 545 match within a threshold level. In some exemplary implementations, determining whether the fingerprints match within a threshold level may be performed in different ways. As an example exemplary implementation, the wireless device may compare each BSSID in the initial fingerprint with the current fingerprint. For each BSSID in the initial fingerprint, the wireless device may determine whether there is a matching BSSID in the current fingerprint. In some exemplary implementations, a BSSID identified by the same number may be considered a matching BSSID. In some exemplary implementations, two BSSIDs may be considered matching if the associated RSSI values in the fingerprint are within a certain threshold. For example, if a BSSID from the initial fingerprint is in the current fingerprint, the wireless device may compare the RSSI values of the initial and current fingerprint to determine a difference. If the difference is within a threshold amount, then that BSSID may be considered matched in the current fingerprint. In some exemplary implementations, the threshold may be the same or similar to that used above to compare the RSSI values of the initial access point. If a threshold number of BSSIDs are considered matched in the current fingerprint, the wireless device may determine not to disconnect from the remote display device. For example, the wireless device may determine not to disconnect if 50% or more of the BSSIDs match in the current fingerprint. In some exemplary implementations, another threshold may be used to determine whether to disconnect from a remote display device. If the wireless device determines not to disconnect from the remote display device, it may return to periodically checking if the BSSID has changed. If a threshold number of BSSIDs do not match in the current fingerprint, the wireless device may continue to block 580 and terminate the connection to the remote display device. For example, if less than 50% of the BSSIDs match in the current fingerprint, the wireless device may determine to disconnect from the remote display device.

In block 580, the wireless device disconnects from the remote display device. In some exemplary implementations the wireless display device may disconnect from the remote display device by stopping the transmission of display data. In some exemplary implementations, the remote display device may further send a notification to the remote display device indicating that the session is being terminated.

FIGS. 6A and 6B depict two example wireless fingerprints, according to an exemplary implementation. A wireless device may generate the initial fingerprint 600 when a connection to a remote display device is established. The wireless display device may generate the current fingerprint 650 to determine whether to disconnect from the remote display device. For example, the current fingerprint 650 may be generated in response to determining that the BSSI of the access point used by the wireless device has changed. Each fingerprint includes a set of network names 610, a set of associated BSSIDs 620, and a set of associated RSSIs, 630. In FIGS. 6A and 6B, the wireless fingerprint includes a list of 10 available networks. In some exemplary implementations, the wireless fingerprint may include fewer or additional elements.

A first element 605 in the initial fingerprint 600 may be the network through which the wireless device has connected to a remote display device. The network name may be SSID1, and the element may have an associated BSSID of 08:62:66:8c:f1:a0 and an associated RSSI of −38. An element 655 in the current fingerprint 650 corresponds to the first element 605 in the initial fingerprint. Element 655 in the current fingerprint corresponds to the same network name of SSID1. However, the BSSID of the access point for SSID1 has changed to 88:f0:31:05:4f:ee. The BSSID of the initial access point is not in the current fingerprint 650, accordingly, the wireless device may continue to determine whether the RSSI of the initial access point is within a threshold. If the RSSI is not within a threshold, the wireless device may continue to compare the elements in the initial wireless fingerprint with elements in the current wireless fingerprint. For example, each element in the initial wireless fingerprint may be compared to the elements in the current wireless fingerprint to determine whether the elements match.

As an example, element 615 in the initial fingerprint 600 has a network name SSID2, a BSSID of 90:72:40:27:2b:8a, and an RSSI of −42. The corresponding element 665 in the current fingerprint 650 has a network name of SSID2, a BSSID of 90:72:40:27:2b:8a, and an RSSI of −38. Therefore, the element 615 may be considered a match to element 665 if the difference between 38 and 42 is within a threshold. For example, if the threshold if 5 units, the element may be considered matched. The wireless device may continue the process for each element of the initial wireless fingerprint. If a threshold number of access points are within the threshold, the wireless device may determine to maintain the connection to the remote display device.

The following examples pertain to further exemplary implementations of the disclosure.

Example 1 is an apparatus for termination of a wireless connection of a wireless device to a remote device, the apparatus comprising a memory device; and one or more processors coupled to the memory device, the one or more processors to: generate a first wireless fingerprint of the wireless device, wherein the wireless fingerprint comprises a first basic service set identification (BSSID) of a first access point to which the wireless device is connected; determine if a BSSID the wireless device is connected to is changed; if the BSSID is changed, perform an active scan of a plurality of wireless channels and generate a second wireless fingerprint for the wireless device based on the active scan; and terminate the wireless connection of the wireless device if the first wireless fingerprint is at least partially different from the second wireless fingerprint.

In example 2, in the apparatus of example 1, the one or more processors are further to determine that the wireless device changed location if a first received signal strength indicator (RSSI) value of the first BSSID and a second RSSI value of the first BSSID have a difference greater than a threshold value, wherein the first RSSI value is generated at the time the wireless connection is established and the second RSSI value is generated at the time of the active scan.

In example 3, in the apparatus of example 1, the first wireless fingerprint comprises a first plurality of service set identifications (SSIDs), a first plurality of BSSIDs, and a first plurality of received signal strength indicators (RSSIs) and the second wireless fingerprint comprises a second plurality of service set identifications (SSIDs), a second plurality of BSSIDs, and a second plurality of received signal strength indicators (RSSIs).

In example 4, in the apparatus of example 1, to determine if the first wireless fingerprint is at least partially different from the second wireless fingerprint, the one or more processors are to determine a number of BSSIDs that are in the first wireless fingerprint and in the second wireless fingerprint.

In example 5, in the apparatus of example 1, to determine if the first wireless fingerprint is at least partially different from the second wireless fingerprint, the one or more processors are to, for each BSSID in a plurality of BSSIDs in the first wireless fingerprint: calculate a difference in a first RSSI value of a BSSID to a second RSSI value of the BSSID; and determine whether the difference is above a first threshold.

In example 6, in the apparatus of example 1, the one or more processors are further to determine that the wireless device changed location in response to determining that the difference is above the first threshold.

In example 7, in the apparatus of example 1, the threshold of the plurality of BSSIDs is a percentage of a total number of BSSIDs in the plurality of BSSIDs.

In example 8, in the apparatus of example 1, the wireless connection provides a communication channel from the wireless device to the remote display device.

In example 9, in the apparatus of example 1, the one or more processors are further to determine that the wireless device changed location at least in part in response to determining that a BSSID of the remote display device is not in the second wireless fingerprint.

Example 10 is a system of a wireless device comprising: application circuitry to generate display data for sharing to a remote display device; and baseband circuitry, coupled to the application circuitry, the baseband circuitry to: negotiate a wireless connection with the remote display device through a first access point having a first BSSID; generate a first wireless fingerprint of the wireless device, wherein the initial wireless fingerprint comprises a first basic service set identification (BSSID) of a first access point to which the wireless device is connected; determine if the wireless device is connected to a second access point with a second BSSID; generate a second wireless fingerprint for the wireless device based on an active scan; and compare the first wireless fingerprint to the second wireless fingerprint to determine whether to terminate the wireless connection.

In example 11, in the system of example 10, the first wireless fingerprint comprises a first plurality of service set identifications (SSIDs), a first plurality of BSSIDs, and a first plurality of received signal strength indicators (RSSIs) and the second wireless fingerprint comprises a second plurality of service set identifications, a second plurality of BSSIDs, and a second plurality of RSSIs.

In example 12, in the system of example 10, to compare the first wireless fingerprint to the second wireless fingerprint, the baseband circuitry is further to, for each BSSID in the first plurality of BSSIDs, determine whether the BSSID is in the second wireless fingerprint.

In example 13, in the system of example 10, to compare the first wireless fingerprint to the second wireless fingerprint, the baseband circuitry is further to, for each BSSID in the first plurality of BSSIDs: calculate a difference in a first RSSI value of the BSSID from the first plurality of RSSIs to a second RSSI value of the BSSID from the second plurality of RSSIs; and determine whether the difference is above a threshold.

In example 14, in the system of example 10, to determine if the wireless device connects to a second access point with the second BSSID, the baseband circuitry is to periodically compare the first BSSID to a current BSSID received from a current access point.

In example 15, in the system of example 10, the baseband circuitry is further to determine that it is to terminate the wireless connection if the BSSID of the remote display device is not in the second wireless fingerprint.

In example 15, the system of example 10, further comprises: radio frequency (RF) circuitry coupled to the baseband circuitry; front-end module circuitry coupled to the radio frequency circuitry; and an antenna coupled to the front-end module circuitry.

Example 16 is an apparatus of a wireless device comprising: means for establishing a wireless connection to a remote display device through a first wireless access point; means for generating one or more wireless fingerprints, wherein the wireless fingerprints include a plurality of service set identifiers (SSIDs) with associated basic service set identifications (BSSIDs) and received signal strength indicators (RSSIs); and means for automatically terminating the wireless connection in response to determining that a first wireless fingerprint is different from a second wireless fingerprint.

In example 17, in the apparatus of example 16, the means for automatically terminating the wireless connection further comprises means for determining a number of BSSIDs that are in the first wireless fingerprint and in the second wireless fingerprint.

In example 18, the apparatus of example 16 further comprises means to periodically determine whether the wireless connection is through a second wireless access point based on a current BSSID used for the wireless connection.

In example 19, in the apparatus of example 16, the means for generating one or more wireless fingerprints comprises means for performing an active scan of available wireless networks.

In example 20, in the apparatus of example 16, the means for automatically terminating the wireless connection is further to determine a difference between a first RSSI value of the remote display device and a second RSSI value of the remote display device and determine whether the difference is below a threshold.

Example 21 is a method comprising generating a first wireless fingerprint of a wireless device, wherein the wireless fingerprint comprises a first basic service set identification (BSSID) of a first access point to which the wireless device is connected; determining if a BSSID the wireless device is connected to is changed; if the BSSID is changed, performing an active scan of a plurality of wireless channels and generate a second wireless fingerprint for the wireless device based on the active scan; and terminating the wireless connection of the wireless device if the first wireless fingerprint is at least partially different from the second wireless fingerprint.

In example 22, the method of example 21 further comprises determining that the wireless device changed location if a first received signal strength indicator (RSSI) value of the first BSSID and a second RSSI value of the first BSSID have a difference greater than a threshold value, wherein the first RSSI value is generated at the time the wireless connection is established and the second RSSI value is generated at the time of the active scan.

In example 23, in the method of example 21 further comprises the first wireless fingerprint comprises a first plurality of service set identifications (SSIDs), a first plurality of BSSIDs, and a first plurality of received signal strength indicators (RSSIs) and the second wireless fingerprint comprises a second plurality of service set identifications (SSIDs), a second plurality of BSSIDs, and a second plurality of received signal strength indicators (RSSIs).

In example 24, in the method of example 21 determining if the first wireless fingerprint is at least partially different from the second wireless fingerprint comprises determining a number of BSSIDs that are in the first wireless fingerprint and in the second wireless fingerprint.

In example 25, in the method of example 21 determining if the first wireless fingerprint is at least partially different from the second wireless fingerprint further comprises, for each BSSID in a plurality of BSSIDs in the first wireless fingerprint: calculating a difference in a first RSSI value of a BSSID to a second RSSI value of the BSSID; and determining whether the difference is above a first threshold.

In example 26, the method of example 21 further comprises determining that the wireless device changed location in response to determining that the difference is above the first threshold.

In example 27, in the method of example 21, the threshold of the plurality of BSSIDs is a percentage of a total number of BSSIDs in the plurality of BSSIDs.

In example 28, in the method of example 21, the wireless connection provides a communication channel from the wireless device to the remote display device.

In example 29, in the method of example 21 the one or more processors are further to determine that the wireless device changed location at least in part in response to determining that a BSSID of the remote display device is not in the second wireless fingerprint.

Example 30 is an apparatus comprising means to perform a method of any of examples 21 to 30.

Example 31 is a machine-readable storage including machine-instructions that, when executed, cause an apparatus to perform a method of any of examples 21 to 30.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler exemplary implementations, specific expression of algorithms in code, specific power down and gating techniques/logic and other specific operational details of computer system have not been described in detail in order to avoid unnecessarily obscuring the present disclosure.

Instructions used to program logic to perform exemplary implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one exemplary implementation, refers to the hardware, which is specifically configured to recognize and/or execute the code to be held on a non-transitory medium. Furthermore, in another exemplary implementation, use of a module refers to the non-transitory medium including the code, which is specifically adapted to be executed by the microcontroller to perform predetermined operations. And as can be inferred, in yet another exemplary implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one exemplary implementation, use of the term logic includes hardware, such as transistors, registers, or other hardware, such as programmable logic devices.

Use of the phrase 'configured to,' in one exemplary implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one exemplary implementation, refers to some apparatus, logic, hardware, and/or element designed in such a way to enable use of the apparatus, logic, hardware, and/or element in a specified manner. Note as above that use of to, capable to, or operable to, in one exemplary implementation, refers to the latent state of an apparatus, logic, hardware, and/or element, where the apparatus, logic, hardware, and/or element is not operating but is designed in such a manner to enable use of an apparatus in a specified manner.

The exemplary implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform exemplary implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one exemplary implementation" or "an exemplary implementation" means that a particular feature, structure, or characteristic described in connection with the exemplary implementation is included in at least one exemplary implementation of the present disclosure. Thus, the appearances of the phrases "in one exemplary implementation" or "in an exemplary implementation" on "in some exemplary implementations" in various places throughout this specification are not necessarily all referring to the same exemplary implementation. Furthermore, the particular features, structures, or characteristics may be combined in any suitable manner in one or more exemplary implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of exemplary implementation and other exemplarily language does not necessarily refer to the same exemplary implementation or the same example, but may refer to different and distinct exemplary implementations, as well as potentially the same exemplary implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "receiving," "determining," "generating," "measuring," "calculating," "setting," "identifying," "executing," "transmitting," "communicating," "accessing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc. as used herein are meant as labels to distinguish among different elements and may not necessarily have an ordinal meaning according to their numerical designation.

What is claimed is:

1. An apparatus for termination of a wireless connection of a wireless device to a remote device, the apparatus comprising:
a memory device; and
one or more processors coupled to the memory device, the one or more processors to:
generate a first wireless fingerprint of the wireless device, wherein the first wireless fingerprint comprises a first basic service set identification (BSSID) of a first access point to which the wireless device is connected;
determine when a current BSSID, corresponding to an access point to which the wireless device is connected to, is changed from the first BSSID to a second BSSID;
when the current BSSID is changed from the first BSSID to the second BSSID, generate a second wireless fingerprint for the wireless device based on an active scan of a plurality of wireless channels; and
terminate the wireless connection of the wireless device when the first wireless fingerprint is at least partially different from the second wireless fingerprint.

2. The apparatus of claim 1, wherein the first wireless fingerprint comprises a first plurality of service set identifications (SSIDs), a first plurality of BSSIDs, and a first plurality of received signal strength indicators (RSSIs) and the second wireless fingerprint comprises a second plurality of service set identifications (SSIDs), a second plurality of BSSIDs, and a second plurality of received signal strength indicators (RSSIs).

3. The apparatus of claim 1, wherein the one or more processors are to determine when the first wireless fingerprint is at least partially different from the second wireless fingerprint, wherein to determine when the first wireless fingerprint is at least partially different from the second wireless fingerprint, the one or more processors are to determine a number of BSSIDs that are in the first wireless fingerprint and in the second wireless fingerprint.

4. The apparatus of claim 1, wherein the one or more processors are to determine when the first wireless fingerprint is at least partially different from the second wireless fingerprint by a threshold, wherein the threshold is a percentage of a total number of BSSIDs in the first wireless fingerprint and a total number of BSSIDs in the second wireless fingerprint.

5. The apparatus of claim 1, wherein the wireless connection provides a communication channel from the wireless device to a remote display device, wherein the one or more processors are further to determine that the wireless device changed location at least in part in response to determining that a BSSID of the remote display device is not in the second wireless fingerprint.

6. The apparatus of claim 1, wherein the one or more processors are further to perform the active scan when the current BSSID is changed from the first BSSID to the second BSSID.

7. The apparatus of claim 1, wherein the one or more processors are further to perform the active scan at a set time interval before the current BSSID is changed from the first BSSID to the second BSSID.

8. An apparatus for termination of a wireless connection of a wireless device to a remote device, the apparatus comprising:
a memory device; and
one or more processors coupled to the memory device, the one or more processors to:
generate a first wireless fingerprint of the wireless device, wherein the first wireless fingerprint comprises a first basic service set identification (BSSID) of a first access point to which the wireless device is connected;
determine when a BSSID the wireless device is connected to is changed;
when the BSSID is changed, perform an active scan of a plurality of wireless channels and generate a second wireless fingerprint for the wireless device based on the active scan;
terminate the wireless connection of the wireless device when the first wireless fingerprint is at least partially different from the second wireless fingerprint; and
determine that the wireless device changed location when a first received signal strength indicator (RSSI) value of the first BSSID and a second RSSI value of the first BSSID have a difference greater than a threshold value, wherein the first RSSI value is generated at the time the wireless connection is established and the second RSSI value is generated at the time of the active scan.

9. An apparatus for termination of a wireless connection of a wireless device to a remote device, the apparatus comprising:
a memory device; and
one or more processors coupled to the memory device, the one or more processors to:
generate a first wireless fingerprint of the wireless device, wherein the first wireless fingerprint comprises a first basic service set identification (BSSID) of a first access point to which the wireless device is currently connected;
determine that the wireless device changes from being connected to the first access point to a second access point;
in response to being connected to the second access point, generate a second wireless fingerprint for the wireless device based on an active scan;
calculate a difference between a first RSSI value corresponding to the first BSSID in the first wireless fingerprint and a second RSSI value corresponding to the first BSSID in the second wireless fingerprint;
determine that the wireless device changed location in response to determining that the difference is above a threshold; and
terminate the wireless connection of the wireless device when the wireless device changed location.

10. A system of a wireless device comprising:
application circuitry to generate display data for sharing to a remote display device; and
baseband circuitry, coupled to the application circuitry, the baseband circuitry to:
negotiate a wireless connection with the remote display device through a first access point having a first BSSID;
generate a first wireless fingerprint of the wireless device, wherein the first wireless fingerprint comprises a first basic service set identification (BSSID) of a first access point to which the wireless device is connected;
determine that the wireless device is currently connected to a second access point with a second BSSID after being connected to the first access point;
generate a second wireless fingerprint for the wireless device based on an active scan in response to the wireless device being connected to the second access point; and compare the first wireless fingerprint to the second wireless fingerprint to determine whether to terminate the wireless connection.

11. The system of claim 10, wherein the first wireless fingerprint comprises a first plurality of service set identifications (SSIDs), a first plurality of BSSIDs, and a first plurality of received signal strength indicators (RSSIs) and the second wireless fingerprint comprises a second plurality of SSIDs, a second plurality of BSSIDs, and a second plurality of RSSIs.

12. The system of claim 11, wherein to compare the first wireless fingerprint to the second wireless fingerprint, the baseband circuitry is further to, for each BSSID in the first plurality of BSSIDs, determine whether the respective BSSID is in the second plurality of BSSIDs of the second wireless fingerprint.

13. The system of claim 11, wherein to compare the first wireless fingerprint to the second wireless fingerprint, the baseband circuitry is further to, for each BSSID in the first plurality of BSSIDs:
calculate a difference in a first RSSI value of the first plurality of RSSIs corresponding to the respective BSSID to a second RSSI value of the second plurality of RSSIs corresponding to the respective BSSID; and
determine whether the difference is above a threshold.

14. The system of claim 10, wherein to determine that the wireless device is currently connected to the second access point with the second BSSID, the baseband circuitry is to periodically compare the first BSSID to a current BSSID received from a current access point.

15. The system of claim 11, wherein the baseband circuitry is further to determine whether to terminate the wireless connection when a BSSID of the remote display device is not in the second wireless fingerprint.

16. An apparatus of a wireless device comprising:
means for establishing a wireless connection to a remote display device through a first wireless access point;
means for generating one or more wireless fingerprints, wherein the wireless fingerprints include a plurality of service set identifiers (SSIDs) with associated basic service set identifications (BSSIDs) and received signal strength indicators (RSSIs), wherein a first wireless fingerprint is generated while being connected to the first wireless access point;
means for determining that the wireless device changes from being connected to the first wireless access point to being connected to a second wireless access point, wherein a second wireless fingerprint is generated while being connected to the second wireless access point;
means for determining that the first wireless fingerprint is different from the second wireless fingerprint; and
means for automatically terminating the wireless connection in response to determining that the first wireless fingerprint is different from the second wireless fingerprint.

17. The apparatus of claim 16, further comprising means for determining a threshold number of matched BSSIDs that are in the first wireless fingerprint and in the second wireless fingerprint.

18. The apparatus of claim 16, further comprising means for periodically determining whether the wireless connection to the remote display device is changed from being through the first wireless access point to being through a second wireless access point based on a current BSSID used for the wireless connection.

19. The apparatus of claim 16, further comprising means for performing an active scan of available wireless networks.

20. A wireless device comprising:
means for establishing a wireless connection to a remote display device through a first wireless access point;
means for generating one or more wireless fingerprints, wherein the wireless fingerprints include a plurality of service set identifiers (SSIDs) with associated basic service set identifications (BSSIDs) and received signal strength indicators (RSSIs);
means for determining a difference between a first RSSI value of the remote display device and a second RSSI value of the remote display device; and
means for determining whether the difference is below a threshold; and
means for automatically terminating the wireless connection in response to determining that the difference is below the threshold.

* * * * *